Aug. 9, 1966  D. BOWMAN  3,265,279
MACHINE FOR CLOSING THE ENDS OF MANIFOLD PIPES
Filed Sept. 9, 1963  10 Sheets-Sheet 1

Fig.1

INVENTOR.
Dudley Bowman.
BY
Wood, Herron & Evans.
ATTORNEYS.

United States Patent Office 3,265,279
Patented August 9, 1966

3,265,279
MACHINE FOR CLOSING THE ENDS OF
MANIFOLD PIPES
Dudley Bowman, Lebanon, Ohio, assignor to Gas Appliance Supply Corporation, Indianapolis, Ind., a corporation of Indiana
Filed Sept. 9, 1963, Ser. No. 307,460
11 Claims. (Cl. 228—17)

This invention relates to a machine for closing the ends of metal pipe sections which are used, for example, as supply manifolds for gas ranges and for other industrial uses. Manifolds of this type were originally produced by threading a closure cap upon a screw threaded end portion of the manifold, the cap forming a gas-tight seal. More recently, manifolds of this type have been produced by a swaging operation, whereby the metallic wall of the pipe is heated and reduced to a plastic state, then rolled or swaged so that the heated plastic metal wall of the pipe forms a closed end.

Pipe closing machines of this general type are disclosed in the prior patents issued to Winford L. Enghauser Nos. 1,939,770 and 2,434,737. The machines disclosed in these patents operate upon the principle of forcing a swaging tool into frictional engagement with the end of a length of spinning pipe. The heat developed by the frictional engagement of the spinning tool reduces the end portion of the pipe to a plastic state, allowing the metal to be swaged or spun to the form of a rounded end wall. The machines disclosed in these patents form the closed end on a single length of pipe during each cycle of operation.

More recently, as disclosed in the patent to Winford L. Enghauser No. 2,754,705, a machine was developed which produces two closed end manifolds upon each cycle of operation. This machine utilizes the principle of first heating the central portion of the length of pipe sufficiently to reduce the metal pipe wall to a plastic state; thereafter, the heated mid-portion is passed between a pair of opposed rotary swaging dies. These dies progressively constrict the heated plastic or malleable mid-portion of the pipe wall, such that the newly-formed end wall eventually is pinched off, forming two lengths of pipe, each having a closed rounded end. The machine thus produces two closed end manifold pipes during each cycle of operation.

The present pipe closing machine is similar, in a general way, to that disclosed in Patent 2,754,705, in that it produces two closed end pipes upon each cycle of operation.

One of the primary objectives of the present invention is to provide a pipe closing machine which severs a length of pipe and imparts a flat smooth end closure to the two ends of the length of pipe, as distinguished from the rounded end which is disclosed in the above-identified patents.

The flat end closure provides a number of advantages over the rounded end closure. In the first place, the flat end closure permits the use of a shorter manifold length, since the last burner outlet hole may be located closely adjacent the flat end closure. Secondly, the flat end closure is better adapted to the machining of a tapped hole in gas ranges which require an end mounting bolt. Thirdly, the flat end closure permits various mounting studs and brackets to be welded directly to the flat end surface (or closely adjacent the flat end) in installations which require such mounting devices.

According to this aspect of the invention, the present machine utilizes a single rotating swaging disk which coacts with a pair of regulating rollers and a pressure roller in swaging the pipe section. In performing the closing operation, the mid-portion of the pipe is heated to a sufficient temperature to bring the metal wall to a plastic state, then the pipe is fed to the rotating regulating rollers which cradle the end portions of the pipe on the sides opposite the heated mid-portion. Thereafter, the pressure roller shifts downwardly into engagement with the outer end portions of the pipe, such that rotary motion is imparted to the length of pipe from opposite ends without imparting any twisting force. After the length of pipe is thus engaged by the rollers and set in motion, the rotating swaging disk is shifted downwardly into tracking engagement with the heated mid-portion of the pipe and progressively depresses or constricts the malleable or plastic mid-portion of the pipe wall to form the two closed ends.

In general, the swaging disk includes a tapered periphery forming a relatively narrow leading edge, with outwardly diverging surfaces leading to the opposite sides of the disk. The disk has a substantial thickness delineated by parallel, smooth side walls, the diverging portions of the tapered periphery blending with the side walls. The arrangement is such that the diverging peripheral portion of the rotating disk progressively depresses the plastic pipe wall as the disk is fed in tracking engagement through the pipe to and beyond its central axis, thus crowding the heated plastic metallic wall portion outwardly in opposite directions until the full thickness of the disk passes beyond the central axis of the rotating pipe.

The thickness of the swaging disk controls the amount of the metal pipe wall which is upset to form the flat end closure during the swaging operation, while the parallel sides of the disk, which delineate its thickness, impart a smooth leakproof end closure which is free from grooves or scars.

A further object of the invention has been to provide a machine which not only imparts a smooth leakproof end closure to the swaged ends of the length of pipe, but which also maintains the true diameter of the two lengths of pipe throughout their length, up to and including the closed ends.

Described generally, it is necessary to confine the length of pipe axially between fixed stops which engage the opposite ends of the rotating pipe confined and rotated by the coacting regulating and pressure rollers. In other words, in the absence of such stops, it would be difficult to form a closed end of the desired character since the action of the swaging disk tends to force the two end portions axially away from one another. On the other hand, with the length of pipe confined between the fixed stops, there is a tendency to create a bulging action in the heated plastic mid-portion of the pipe due to crowding of the metallic pipe wall by the action of the swaging disk. In order to eliminate this tendency, the regulating rollers are arranged to track upon the periphery of the pipe in close proximity to the swaging disk during formation of the end closure, thus rolling out any bulging which may develop in the heated mid-portion due to displacement of the plastic metal. Maintaining the true diameter of the pipe is critical in the assembly of the gas range in that the mounting brackets, which support the manifold, are made to relatively close tolerances and must be slipped over the closed end of the pipe without interference.

A further objective of the invention has been to provide a machine which is adapted to form end closures on various dimeters of pipes without the need of modifying the machine to accommodate various pipe diameters within a given range.

As noted above, the present machine utilizes a single swaging disk, coacting with regulating rollers and pressure rollers in performing the swaging operation. The pressure rollers are shiftable in an arc with respect to the regulating rollers; therefore, the rollers are adapted to engage and rotate lengths of pipe having various diameters without the necessity of modifying the machine to accommodate the particular diameter of pipe which is being acted upon.

The swaging disk is also shiftable through an arc with respect to the length of pipe which is confined in rotation between the regulating rollers and pressure roller, such that the disk is also adapted to act upon the various diameters of pipe, within limits, without requiring any modification of the machine. As noted above, the thickness of the swaging disk regulates the thickness of the end closure which is formed on the pipe, since the thickness determines the amount of plastic pipe wall lineally of the pipe, which is displaced or upset to form the end closure. However, beyond certain limitations in pipe diameter, it is necessary to utilize a swaging disk having a greater thickness in order to form an end closure of the necessary thickness.

In the machine selected to illustrate the principles of the invention, the pressure roller and the swaging disk are pivotally mounted with respect to the regulating rollers and are shifted by air cylinders during the operating cycle. Thus, at the beginning of a cycle the length of pipe, with its mid-portion heated to a sufficient temperature, is fed to a position in which it is cradled between the parallel pair of rotating regulator rollers. During the next step of the sequence, the pressure roller is caused by its cylinders to descend upon the length of pipe to hold it in pressure engagement against the rotating regulating rollers. Thereafter, the swaging roller is swung by operation of its cylinder through an arc of motion into tracking engagement with the rotating length of pipe to perform the pipe closing operation.

The swaging disk thereafter retracts to its elevated position and the pressure roller shifts upwardly to release two sections of closed end pipes which are then discharged from the machine. The sequence of operation may be regulated either manually or by an automatic control system as dictated by production requirements.

In the example illustrated, the swaging disk is rotated by one variable speed motor and the regulating rollers are rotated by a second variable speed motor. This arrangement permits the speed of rotation of the disk and the speed of the regulating rollers to be controlled in accordance with the diameter of the pipe and other variable factors which may be involved in production.

It will be understood that the present disclosure is intended to illustrate the operating principles under manual operation. However, it is contemplated to incorporate an automatic control system (not shown) adapting the machine to run through the pipe closing cycle in an automatic manner, utilizing the same principles.

The various features and advantages of the invention will be more fully apparent to those skilled in the art from the following detailed description taken in conjunction with the drawings.

*General arrangement*

The general arrangement of the pipe closing machine selected to illustrate the principles of this invention, is best illustrated in FIGURES 1–5. As shown in these views, the machine essentially comprises a table, indicated generally at 1, which is mounted upon a suitable support structure 2 at an elevation convenient to the operator. The rotating swaging disk, indicated generally at 3, is journalled upon the swinging end portion of a carriage indicated generally at 4. The carriage, in turn, is pivotally mounted as indicated at 5 upon a pair of standards 6—6 rising from the table 1.

Rotary motion is imparted to the swaging disk 3 by a gear head motor, indicated generally at 7, which is mounted upon the rearward end portion of the carriage 4. The swaging disk 3 and motor are located on opposite sides of the pivot point 5 of the carriage, such that the two components tend to counterbalance one another. The gear head motor 7 is in driving connection with the swaging disk 3 by means of a sprocket chain 8 which passes over suitable sprockets of the gear head motor 7 and swaging disk 3, as explained later. It will be understood at this point, that the gear head motor 7 is of a conventional, variable speed type, such that the tracking speed of the swaging disk may be varied, as explained below.

Figure 3:
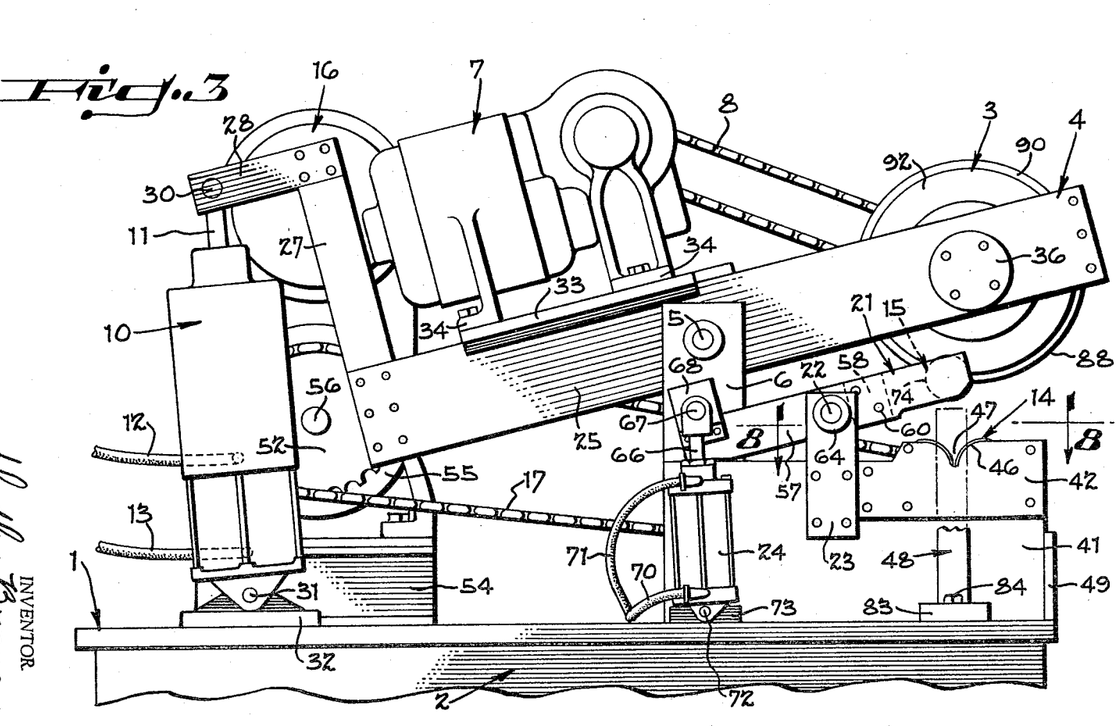
FIGURE 3 is a side elevation of the pipe closing machine with the components shifted to the open or pipe-receiving position corresponding to FIGURE 1.
Figure 4:
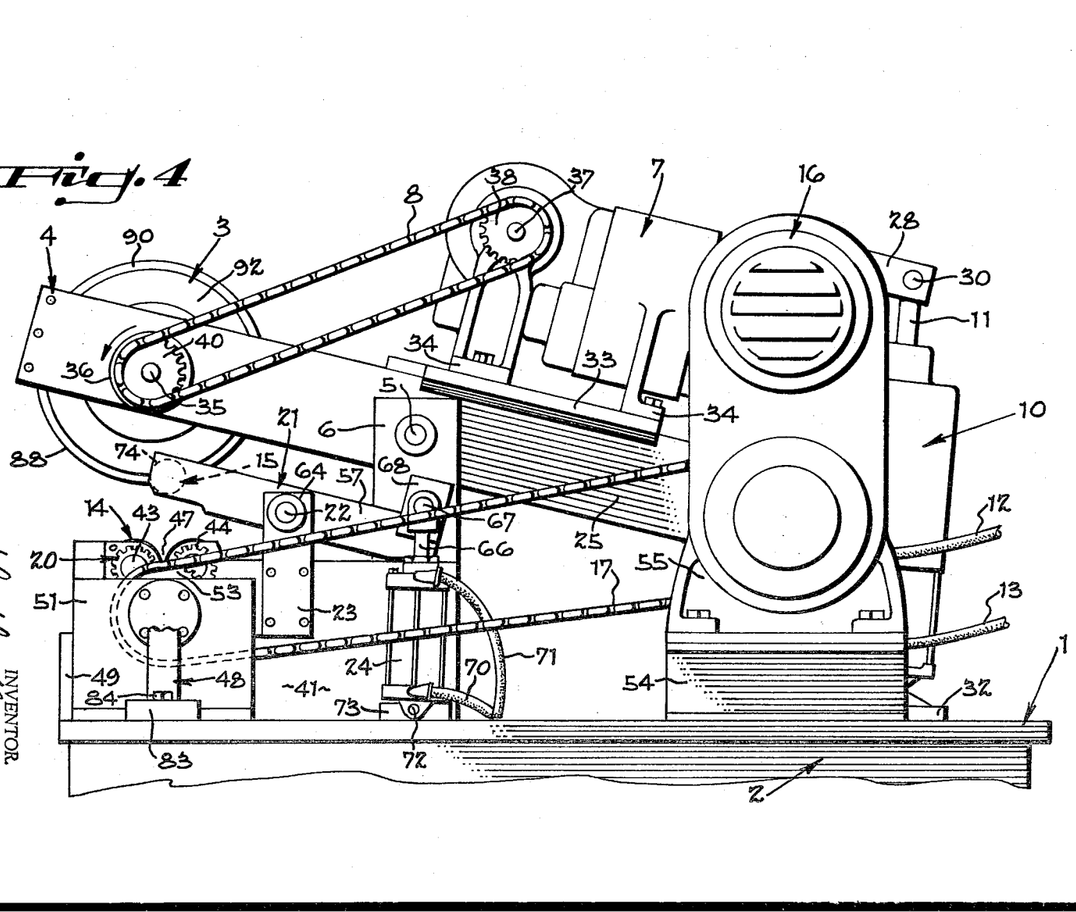
FIGURE 4 is an elevation of the machine taken from the side opposite that shown in FIGURE 3, with the parts in the corresponding pipe-receiving position and further illustrating the general arrangement of the machine.
Figure 6:
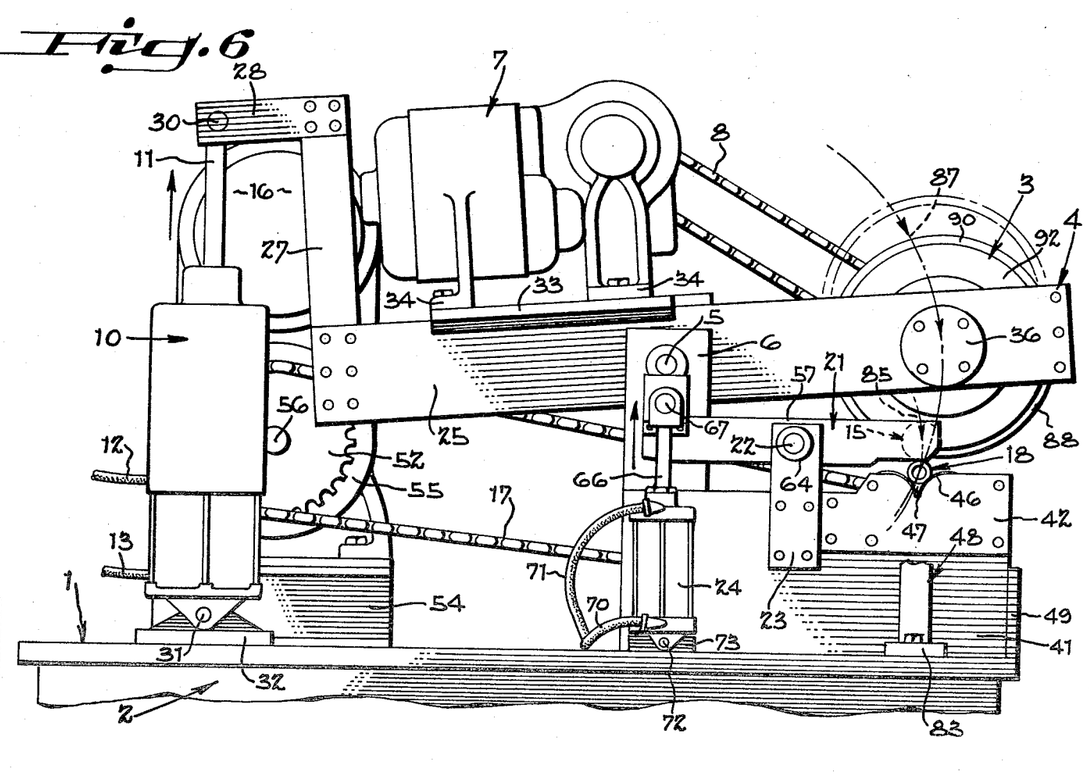
FIGURE 6 is a side elevation, similar to FIGURE 5, showing the pipe swaging disk in its lowered position, representing the second step in the pipe closing cycle.

In the present disclosure, swinging motion, during the pipe closing cycle, is imparted to the carriage 4 by an air cylinder, which is indicated generally at 10. The air cylinder includes a piston (not shown), having a piston rod 11 connected to the rearward end of the carriage 4 so as to swing the carriage through its operating stroke thereby to shift the swaging disk 3 in an arc relative to the axis of the pipe during the pipe closing cycle. Air pressure is supplied and exhausted with respect to the cylinder 10 by way of the conduits 12 and 13 so as to swing the swaging disk 3 downwardly during the pipe closing cycle and to return the disk to its elevated, pipe-receiving position at the end of the cycle. The position of the disk at the beginning of the cycle is shown in FIGURES 3 and 4 and its arcuate path of motion during the cycle is indicated in FIGURE 6.

Admission of air to cylinder 10 preferably is controlled by an electrically-operated reversing valve (not shown), of conventional design. Operation of the reversing valve, which controls cylinder 10, preferably is regulated by electrical signals transmitted by an automatic control system which regulates the sequence of operation. The cycle may be initiated by an operator, utilizing a foot-operated treadle or the like. On the other hand, the cycle may be initiated automatically in response to the feeding of pipe sections into the machine by a feed mechanism (not shown), which is arranged to heat the mid-portion of the pipe sections to the required swaging temperature as they are fed into the machine.

As explained in detail later, the machine is provided with a pair of regulating rollers indicated generally at 14, and a pressure roller, indicated generally at 15 (FIGURES 1-3), which impart rotary motion to the length of pipe as its heated mid-portion is acted upon by the swaging disk 3. The operation of the pressure roller is also regulated by the control system, such that the length of pipe is engaged by the rollers and rotated as the swaging disk shifts from its elevated, inactive position downwardly into tracking engagement with the heated mid-portion of the pipe. When arranged for automatic operation, the machine also may be equipped with a discharge mechanism which ejects the two closed end pipe sections from the machine at the end of each operating cycle.

In practice, it has been found that best results are obtained by rotating the swaging disk 3 at a speed, whereby the periphery of the disk advances at the same rate, that is, at substantially the same lineal speed as the surface speed of the rotating pipe, as imparted to the pipe section by the regulating rollers 14. The gear head motor 7, which imparts rotary motion to the swaging disk 3, and a gear head motor 16, which imparts rotary motion to the regulating rollers 14, are both of the variable speed type. This permits the lineal surface speed of the swaging disk and of the rollers to be synchronized for a given pipe diameter. It will be understood that when the machine is set up for pipe sections having a larger or smaller diameter, the speed of the swaging disk motor 7 and of the regulating roller motor 16 both are adjusted to provide the necessary operating speeds.

Figure 5:
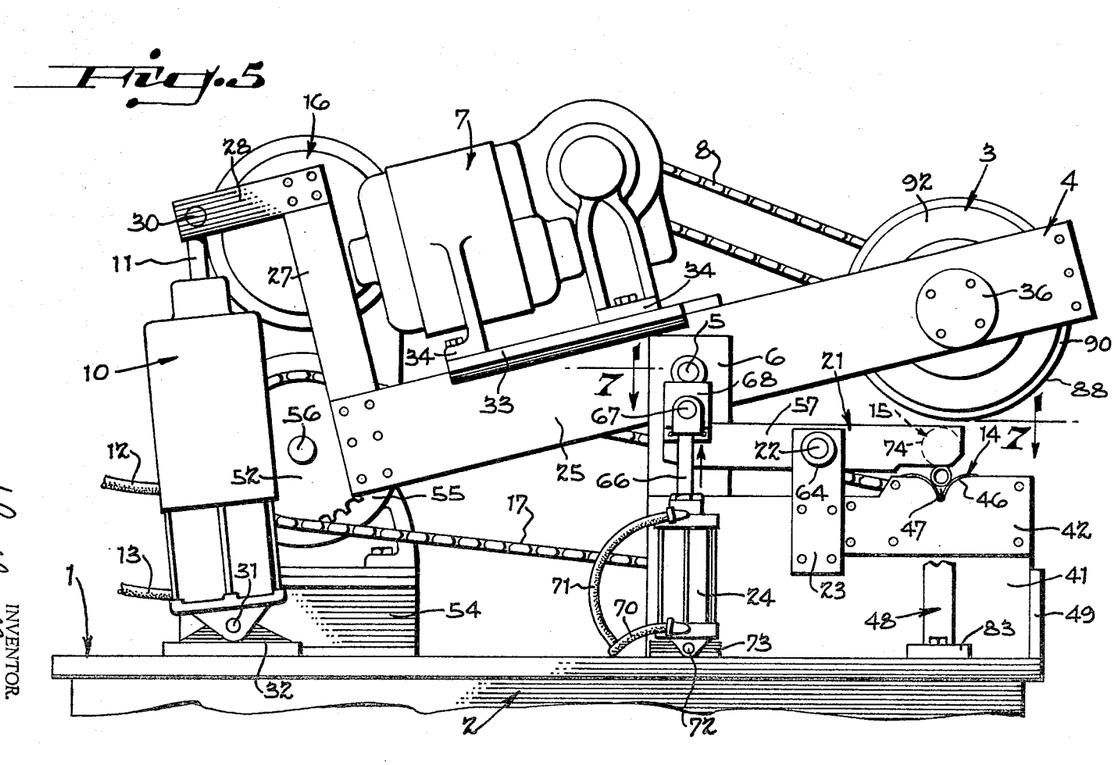
FIGURE 5 is a side elevation, generally similar to FIGURE 3, showing a length of pipe positioned in the machine with the regulating rollers in the pipe-engaging position which constitutes the first step in the pipe closing cycle.

The gear head motor 16, which drives the regulating rollers 14, is connected by way of a sprocket chain 17 to the regulating rollers 14, the motor and rollers being provided with sprockets, as described later, which mesh with the chain 17. The regulating rollers 14 are mounted in spaced parallel relationship so as to cradle the pipe section, indicated generally at 18, between the rollers (FIGURE 5). As explained later in detail, the rollers are driven by a gear train, indicated generally at 20 (FIGURES 4 and 8-10) which rotates both rollers in the same direction so as to impart the desired rotary motion to the length of pipe which is cradled between the two rollers.

The pressure roller 15 is mounted in a swinging holddown frame, indicated generally at 21 (FIGURES 1-7), which is pivotally mounted as at 22 between a pair of standards 23 attached to the plates which journal the regulating rollers 14. The pressure roller 15 normally resides in the elevated, pipe-receiving position (FIGURE 4) above the regulating rollers 14, and as explained later, is swung downwardly into engagement with the pipe section 18 by operation of a pair of air cylinders 24—24.

*Swaging disk carriage*

Figure 1:
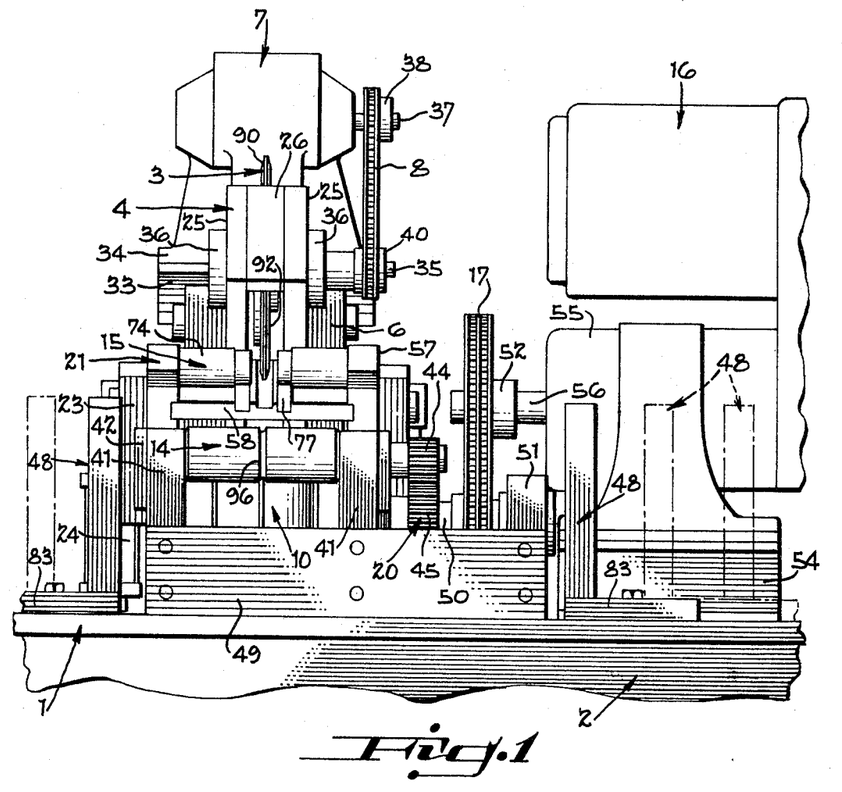
FIGURE 1 is a fragmentary front elevation of a pipe closing machine illustrating the principles of the present invention.
Figure 2:
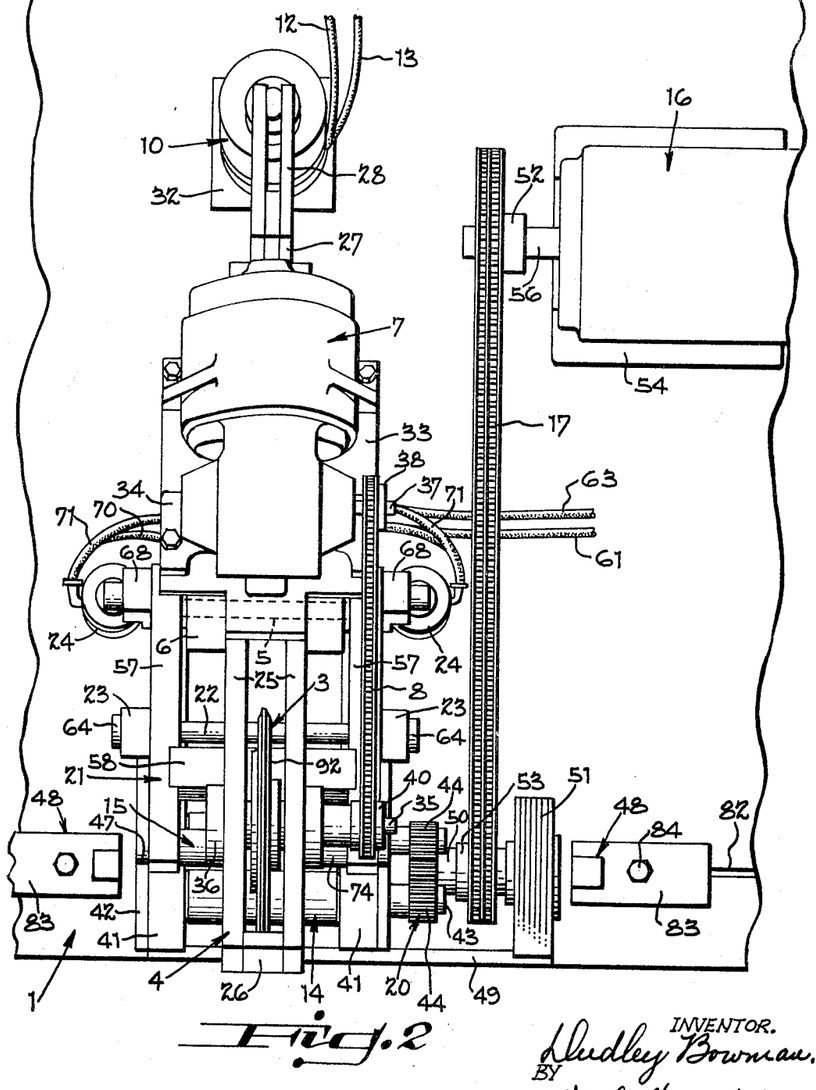
FIGURE 2 is a top plan view, as projected from FIGURE 1, further illustrating the general arrangement of the pipe closing machine.

Described in detail, the rocking carriage 4, which journals the swaging disk 3, comprises a frame having parallel side rails 25—25 (FIGURES 1-3). The forward ends of the rails 25 are joined by a cross-piece 26 and the rearward ends are joined by a bracket 27, which is generally of inverted L-shaped configuration, providing a horizontal limb 28. The outer end of limb 28 is pivotally connected as at 30 to the piston rod 11 of the carriage actuating cylinder 10.

Figure 16:
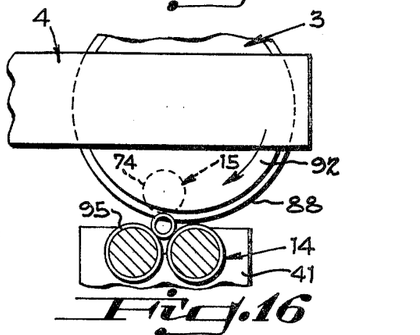
FIGURE 16 is a diagrammatic side view, as projected from FIGURE 15.

As noted earlier, the carriage 4 is pivotally supported as at 5 upon the standards 6—6 for rocking motion in response to operation of the air cylinder 10. In order to accommodate the arcuate motion of the pivot point 30, the lower end of cylinder 10 is pivotally connected as at 31 to a bracket 32 which is secured to the table 1. As air pressure is admitted to the lower end of cylinder 10 by way of conduit 13 and exhausted by way of conduit 12, the piston rod 11 shifts upwardly, causing the carriage 4 to be pivoted from the open, pipe-receiving position of FIGURE 1 toward the swaging position shown in FIGURES 6, 16 and 17. At completion of the swaging operation, air pressure is applied to cylinder 10 by way of conduit 12 and is exhausted by way of conduit 13 to shift the carriage 4 back to the starting position (FIGURES 3 and 4).

The pivot 5 which supports the carriage 4 for rocking motion comprises a shaft passing through the standards 6—6 and through the side rails 25—25 of carriage 4 so as to stabilize the carriage against lateral deflection (FIGURE 2). The variable speed gear head motor 7 is mounted directly upon the upper edges of the rails 25 of carriage 4, the carriage being provided with a mounting plate 33 extending across the side rails 25—25 rearwardly of the pivot point 5 (FIGURES 3 and 4). The gear head motor 7 includes mounting brackets 34—34 which are bolted to the mounting plate 33, such that the motor swings in an arc in unison with the motion of carriage 4.

The swaging disk 3 (FIGURES 2, 4 and 12) is keyed upon a cross shaft 35 which is rotatably journalled in bearings 36—36 which are secured to the side rails 25—25. The output shaft 37 of the gear head motor 7 includes a sprocket 38 meshing with the sprocket chain 8 previously described (FIGURES 2 and 4). Keyed to the cross shaft 35 of swaging disk 3 is a driven sprocket 40 meshing with the chain 8 so as to impart rotary motion to the swaging disk. As noted above, the motor 7 is of the variable speed type, permitting the rate of rotation of the swaging disk to be regulated in accordance with the diameter of the pipe sections which are being acted upon by the machine.

*Regulating rollers*

The regulating rollers, previously indicated at 14 (FIGURES 1-3 and 8-10) are rotatably journalled in a pair of spaced bearing plates indictaed at 41—41 projecting upwardly from the table 1. Respective end plates 42—42 are attached to the upper portions of the bearing plates.

Figure 8:
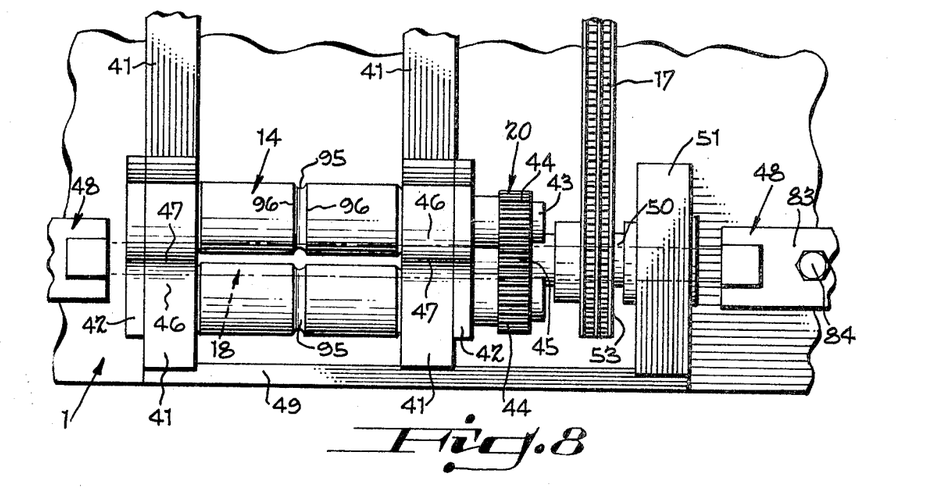
FIGURE 8 is a fragmentary top plan view taken along line 8—8 of FIGURE 3, illustrating the regulating rollers which coact with the pressure rollers in rotating the pipe section during the swaging operation.
Figures 9, 10:
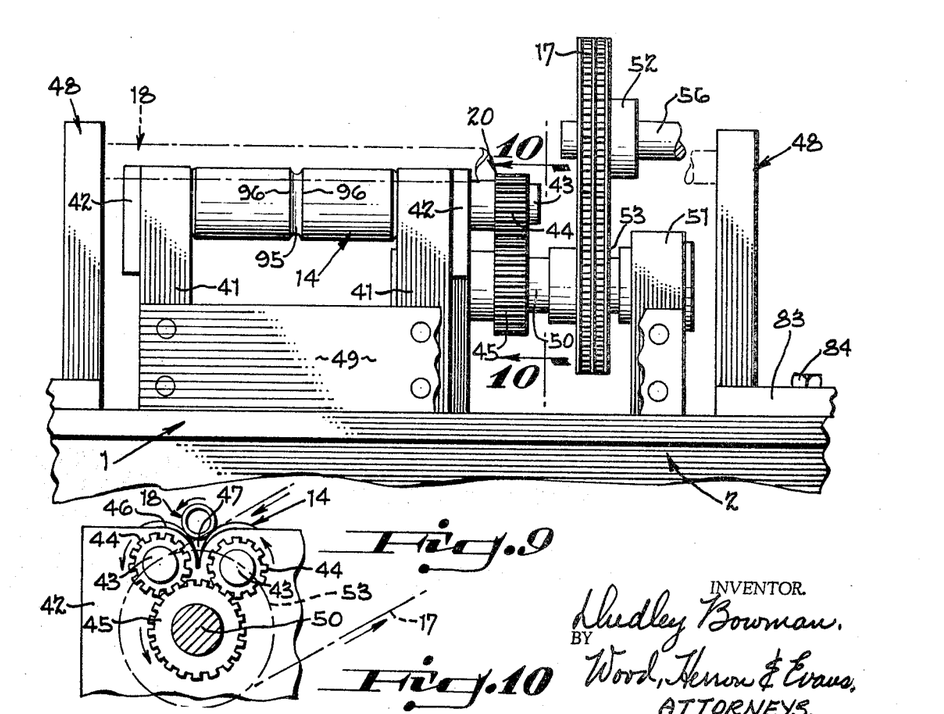
FIGURE 9 is a fragmentary front elevation, as projected from FIGURE 8, further illustrating the regulating rollers and the driving system thereof.
FIGURE 10 is a fragmentary sectional view taken along line 10—10 of FIGURE 9, illustrating the gear train of the regulating rollers.

As detailed in FIGURES 5 and 8-10, the parallel regulating rollers 14—14 are spaced slightly apart from one another in order to receive and cradle the pipe section 18 as noted earlier. The gear train, indicated generally at 20, is arranged to rotate both rollers in the same direction in order to impart the necessary rotary motion to the pipe section 18. For this purpose, the rollers each are mounted upon respective shafts 43—43 passing through the bearing plates 41, each shaft having a driven gear 44 keyed to the outer end portion thereof. A drive gear 45, connected to the gear head motor 16, meshes with the gears 44—44, thus rotating both regulating rollers 14 in the direction indicated by the arrow (FIGURE 10).

As best shown in FIGURES 3–5 and 10, the upper edge of each bearing plate 41 is provided with opposed downwardly curved edges 46—46 which are generated upon centers common to the central axes of the shafts 43 of the regulating rollers 14. The curved edges 46 thus delineate a downwardly converging throat 47, providing clearance for the opposite end portions of the pipe section 18, which projects outwardly beyond the regulating rollers. The opposite ends of the rotating pipe section 18, which project beyond the bearing plates 41, are engaged by opposed stops 48—48 which rise from the table 1, as described later.

As best shown in FIGURES 8–10, the drive gear 45 is mounted on a stub shaft 50 having one end journalled in a bearing bracket 51 and having its opposite end journalled in one of the bearing plates 41. A cross plate 49 secures the bearing plates 41—41 and the bracket 51 together for reinforcement. As noted earlier, the regulating rollers 14 are rotated by the gear head motor 16 which is connected to the regulating rollers by way of the sprocket chain 17. The sprocket chain 17 meshes with a sprocket 52 keyed to the shaft of the variable speed gear head motor 16 which drives the regulating rollers (FIGURES 2 and 5). The stub shaft 50 of drive gear 45 includes a sprocket 53 keyed thereon, and meshing with the chain 17, thereby to rotate the regulating rollers 14 by operation of motor 16. As noted earlier, the motor 16 is of the variable speed type, adapting the speed of rotation of the regulating rollers to be adjusted to match the peripheral speed of the swaging disk 3.

The gear head motor 16 is mounted upon a base 54 (FIGURES 3–5) rising from the table 1. In order to adjust the tension of sprocket chain 17, the base 54 preferably is adjustably secured to the table by conventional means (not shown). In the form selected to illustrate the principles of the invention, the gear head motor 16 is provided with a gear casing 55 including a reduction gear train in driving connection with the shaft 56 upon which is keyed the sprocket 52.

*Pressure roller mechanism*

As noted earlier, the pressure roller 15 shifts downwardly through an arc and forces the pipe section 18 into engagement with the regulating rollers 14 during the swaging or pipe closing operation. The pressure roller 15 is in the form of two sections aligned with one another and spaced apart axially to provide clearance for the swaging disk 3 during its downward movement in the swaging cycle. In the present example, the two sections of the pressure roller 15 are not power driven; instead, they are in the form of idlers which are mounted for rotation within the swinging hold-down frame, previously indicated at 21.

Described in detail with reference to FIGURES 2–5 and 7, the hold-down frame 21 comprises a pair of parallel side rails 57—57 held rigidly in spaced relationship by a cross bar 58 which is secured by screws 60—60 to the rails 57. The hold-down frame 21 is mounted for rocking motion upon the cross shaft, previously indicated at 22, which passes through the side rails 57—57. The outer end portions 62—62 of the cross shaft 61 are journalled in the standards 23, which project upwardly from the bearing plates 41—41, as noted earlier. The ends of the shaft 22 project outwardly beyond the standards 23 and include respective collars 64—64, which are secured in place by screws 65 to hold the shaft against endwise displacement.

Figure 7:
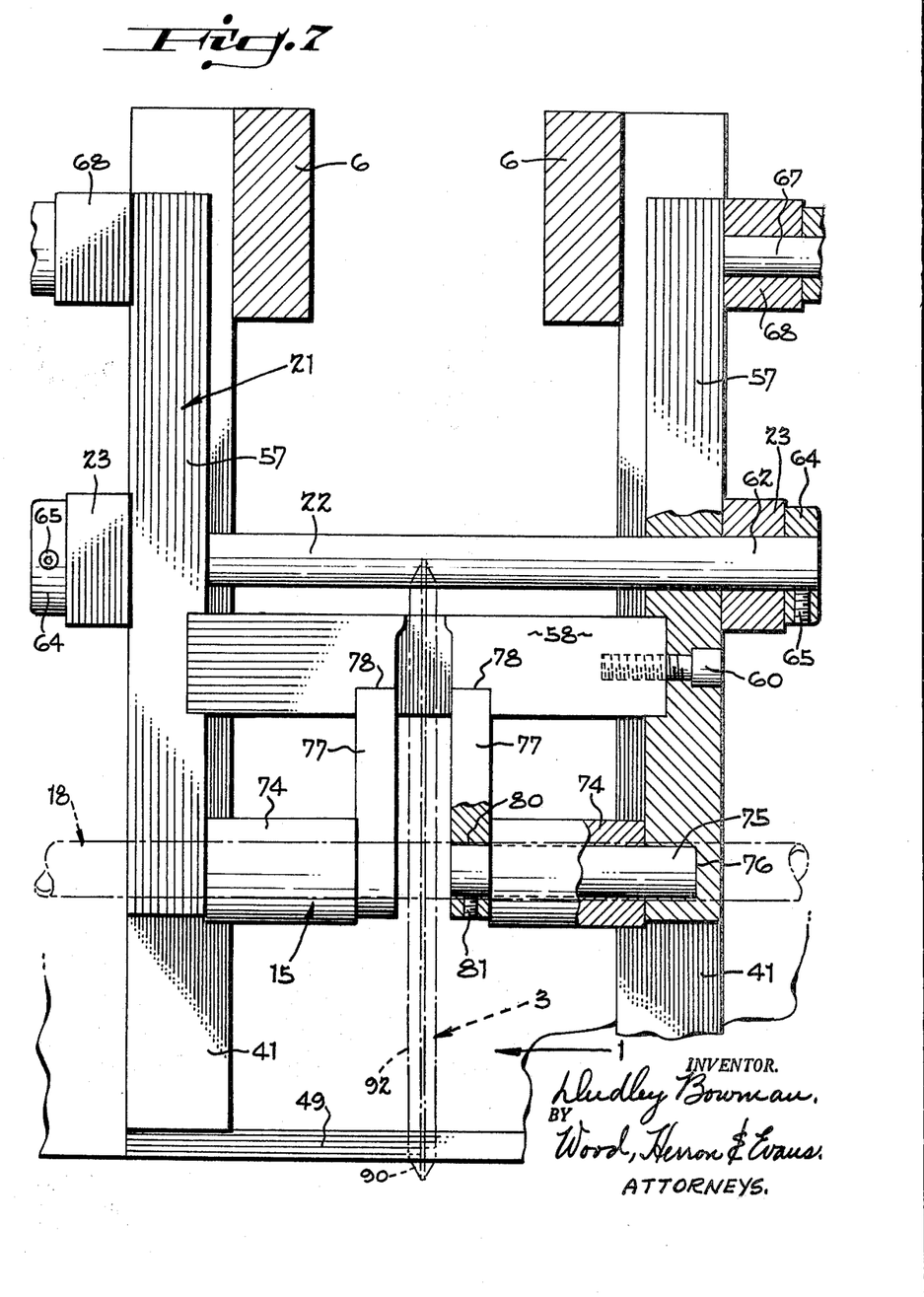
FIGURE 7 is a sectional view taken along line 7—7 of FIGURE 5, detailing the pressure roller and mounting mechanism in relation to the swaging disk.

Rocking motion is imparted to the hold-down frame 21 by the pair of air cylinders, previously indicated at 24, the two air cylinders being connected to the respective side rails 57 of the frame to balance the forces. As best shown in FIGURES 6 and 7, each air cylinder 24 includes a piston (not shown) having a piston rod 66 having an upper end pivotally connected as at 67 to a block 68, which is attached to the rearward end portion of the side rail 57. A conduit 70 is connected in common to the lower end of the respective air cylinders 24 and a second conduit 71 is connected in common to the upper ends of the cylinders 24. The conduits 70 and 71 are connected to the reversing valve which supplies and exhausts cylinders 24—24. Air pressure from the reversing valve is supplied to the conduits 70 or 71 by way of the conduits 61 or 63 (FIGURE 2).

When the pressure roller 15 is to be shifted downwardly to hold the pipe section 18 in pressure engagement against the regulating rollers 14 (FIGURE 6), air pressure is supplied by way of conduit 70 through cylinders 24 and exhausted by way of the conduits 71. When the swaging operation is completed, the pressure roller 15 is shifted to the open position (FIGURE 3) by applying air pressure by way of the conduit 71 and exhausting by way of the conduit 70. In order to accommodate the arc of motion of the hold-down frame 21, the lower end of the cylinders 24 are pivotally connected as at 72 to a bracket 73 which is attached to the table 1.

As best shown in FIGURE 7, the aligned sections of the pressure roller 15 are indicated at 74—74, the ends of the rollers being spaced apart from one another to provide clearance for the swaging disk 3 during the pipe closing stroke of the disk. The roller sections 74 are rotatably journalled upon respective stub shafts 75—75. The outer ends of the stub shafts 75 are confined in blind holes 76 formed in the swinging end portions of the side rails 57.

The adjacent inner ends of the stub shafts 75 are supported in mounting blocks 77—77. The mounting blocks have their ends secured as at 78 to the cross bar 58 of hold-down frame 21, the blocks projecting in cantilever fashion from cross bar 58 forwardly. Each block 77 is bored as at 80 to receive its stub shaft 75. The end portion of each stub shaft is secured to its mounting block 77 by a screw 81.

*Operation*

Figure 11:
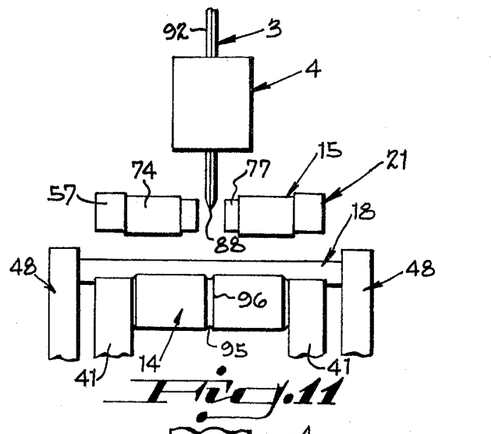
FIGURE 11 is a diagrammatic front elevation, showing the relationship of the regulating rollers, pressure roller and swaging disk at the start of the pipe swaging operation.
Figure 12:
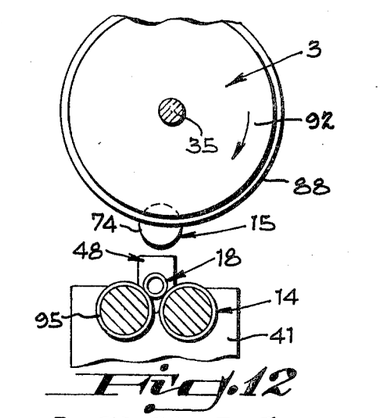
FIGURE 12 is a diagrammatic side view, as projected from FIGURE 11, further illustrating the relationship of parts at the start of the swaging operation.

At the start of the pipe closing cycle, the swaging disk carriage 4 and the frame 21 of the pressure roller 15 both reside in the elevated position shown in FIGURES 3, 11 and 12, adapting the pipe section 18 to be fed to its swaging position between the regulating rollers 14—14. As noted earlier, the pipe sections may be fed automatically one by one from a suitable heating and feeding apparatus and the cycle may be initiated and carried out in an automatic manner in response to the feeding of the individual pipe sections. As the pipe section 18 is positioned on the regulating rollers, the stops 48—48 engage its opposite ends to confine the pipe axially, thereby to prevent the two end portions from being forced apart from one another during the swaging or closing operation.

In order to regulate the length of the two closed end pipe sections, the stops 48—48 are adapted to be adjusted relative to one another with respect to the regulating rollers. For this purpose, the table 1 (FIGURE 2) may be provided with slots 82. Each stop 48 includes a foot 83 seated upon the table 1 and secured in place by a clamping screw 84. Each screw passes through the slot 82 and includes a nut (not shown) engaged against the bottom surface of the table 1, thus permitting the position of the stop 48 to be adjusted.

When the machine is arranged for full automatic operation, as pointed out above, the fixed stops 48 are replaced with shiftable stops (not shown) which may be actuated either by air pressure or electrically. At the start of the automatic cycle the stops are shifted apart from one another to a retracted position to receive the pipe section as it is fed from the heating and feeding apparatus to the regulating rollers. Thereafter the stops are shifted toward one another and into engagement with the opposite ends of the pipe section thereby to hold the pipe against axial forces which are developed during the swaging operation.

Figure 13:
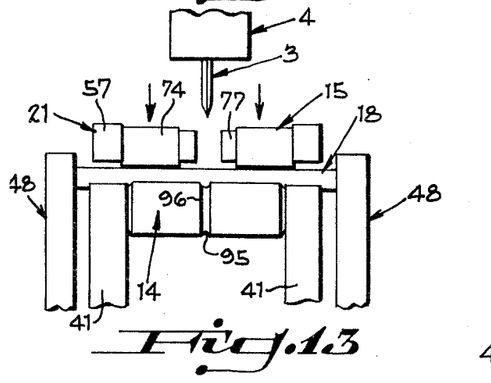
FIGURE 13 is a diagrammatic view similar to FIGURE 11, showing the first step of the swaging operation in which the pressure roller shifts downwardly to hold the pipe in pressure engagement with the regulating rollers to impart rotary motion to the pipe section during the swaging operation.
Figure 14:
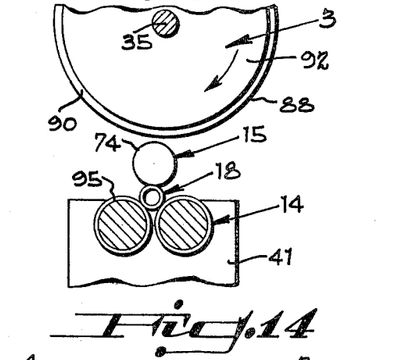
FIGURE 14 is a side elevation, as projected from FIGURE 13, further illustrating the relationship of the parts in the first step of the cycle.

When the cycle is initiated, the hold-down frame 21 first swings downwardly by operation of the cylinders 24—24 (FIGURES 5, 13 and 14), thereby to forcibly hold the pipe section 18 in tracking engagement with the rotating regulating rollers 14—14. As shown in FIGURE 6, the pressure roller 15 swings about the pivot point 22 in an arc indicated at 85 during its downward motion. The arc 85 passes through the axis of the pipe section 18 which is cradled between the regulating rollers 14—14. As explained earlier, the mid-portion of the pipe section 18 is heated to a temperature to reduce the metallic pipe wall to a plastic state before it is fed into the machine.

After the air cylinders 24—24 have shifted the pressure roller sections 74—74 into pressure engagement with the pipe section 18, the air cylinder 10 is energized to shift the swaging carriage 4 downwardly to bring the swaging disk 3 into tracking engagement with the heated mid-portion 86 of the pipe section 18 (FIGURES 6, 15, 16 and 17). The arc of motion of the swaging disk about the pivot point 5 is indicated at 87 (FIGURE 6). It will be noted that the arc 87 also passes through the central axis of the pipe section 18.

It will be understood at this point that the swaging disk 3 and regulating rollers 14 preferably are rotated continuously during the operation of the machine by their respective motors 7 and 16. The speed of rotation of the swaging disk and regulating rollers are synchronized, such that the peripheral speed of the swaging disk is substantially equal to the surface speed of the pipe at its periphery, as imparted by the regulating rollers 14—14.

As the swaging disk begins to track upon the heated plastic wall 86 of pipe section 18, the relatively narrow leading edge 88 of disk 3 tracks against the periphery of the pipe section and begins to depress or upset the plastic pipe wall, as indicated at 89 in FIGURES 15–18. During continued downward motion of the disk 3, the outwardly diverging side edges 90—90 of the disk begin to crowd the plastic metal wall outwardly, thus progressively increasing the upset metal area 89 and forcing the metal outwardly in opposite directions.

Figure 19:
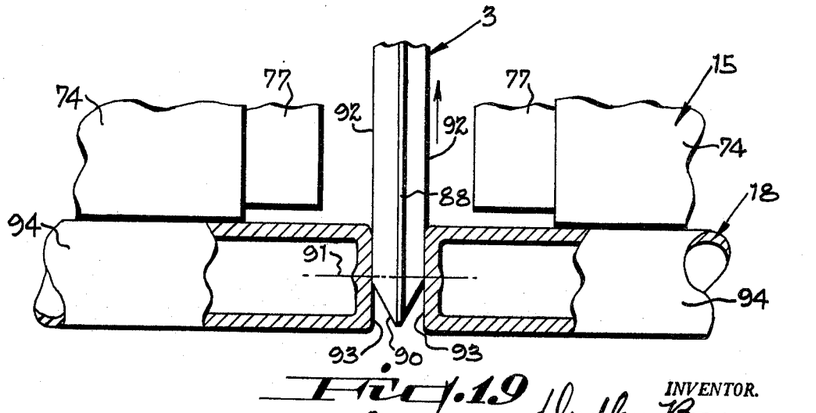
FIGURE 19 is a diagrammatic view similar to FIGURE 18, showing the position of the swaging disk at completion of the pipe closing cycle.

As the leading edge 88 of the disk passes beyond the central axis 91 of the pipe section 18 (FIGURE 19), the depressed wall portions are severed from one another. Finally, the straight side walls 92—92 of the disk act upon the severed ends of the pipe wall to form the flat smooth end closures indicated at 93—93 in FIGURE 19, thus forming the two closed end manifolds 94—94. Upon reaching the position shown in FIGURE 19, the swaging operation is completed and the swaging disk thereafter is shifted upwardly, as indicated by the arrow, to its open position ready for the next cycle.

Figure 15:
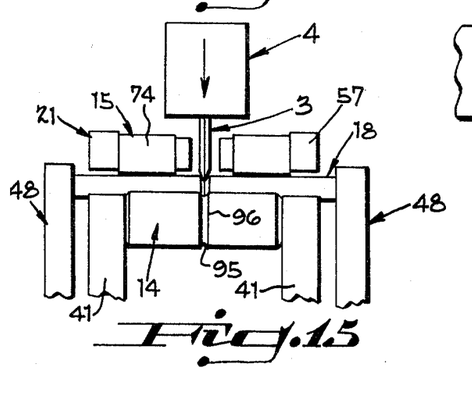
FIGURE 15 is a diagrammatic front elevation similar to FIGURE 13, showing the second step of the cycle in which the swaging disk is shifted downwardly into tracking engagement with the rotating length of pipe.
Figure 17:
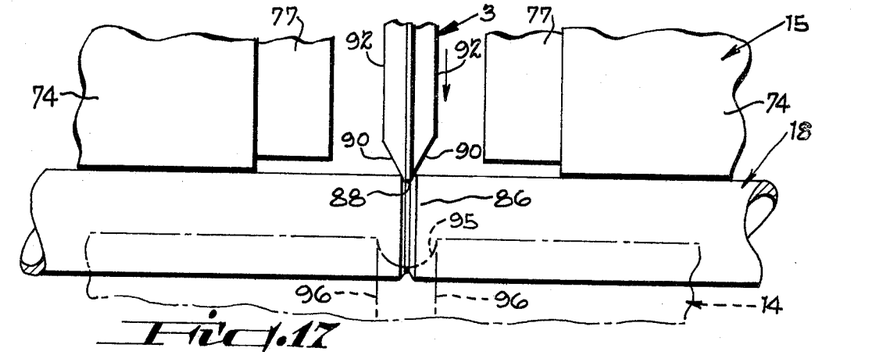
FIGURE 17 is an enlarged fragmentary diagrammatic view, as viewed from the front, showing the parts at the start of the swaging operation, with the swaging disk acting upon the length of pipe, the position of the parts corresponding to that shown in FIGURE 15.
Figure 18:
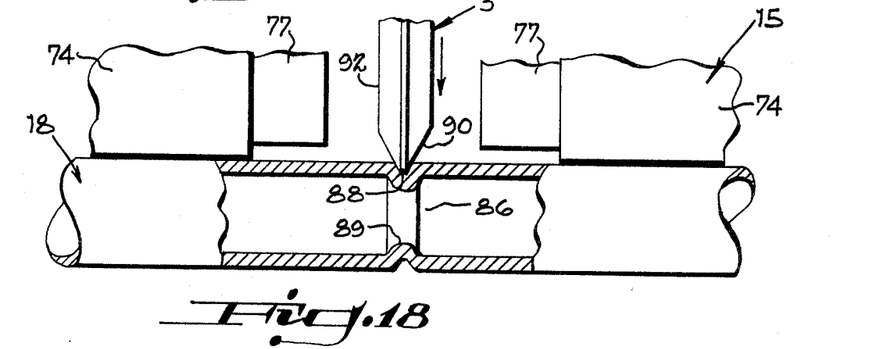
FIGURE 18 is a fragmentary diagrammatic view similar to FIGURE 17, with the central portion of the pipe shown in section to illustrate the action of the swaging disk.

It will be noted in FIGURES 15 and 17 that the regulating rollers each include a clearance groove 95 delineating the shoulders 96—96 on opposite sides of the swaging disk 3. The shoulders 93 are diposed substantially in alignment with the opposite sides 92—92 of the disk. The areas of the shoulders 96 thus provide a rolling action in the plastic mid-portion 86 of the pipe wall to prevent any bulging during formation of the end closures 93. As explained earlier, the stops 48—48 hold the pipe against axial spreading or elongation during the swaging operation and thus coact with the rollers and disk. It will also be observed that the thickness of the swaging disk (the distance across the flat sides 92) determines the thickness of the end closures 93 by controlling the mass of metal wall which is displaced in forming the end closures 93.

Having described my invention I claim:

1. A machine for forming two closed end pipes by progressively constricting and severing a heated malleable portion of a pipe section comprising;
   a single rotatable swaging disk;
   a pair of rotatable regulating rollers adapted to cradle a pipe section having a heated, malleable portion; said regulating rollers each being provided with a surface which supports the pipe section at the heated malleable portion thereof;
   power means adapted to impart rotary motion to the swaging disk and regulating rollers;
   a pressure roller adapted to engage the pipe section which is cradled between said regulating rollers; said pressure roller being provided with two sections axially aligned, with the adjacent inner ends thereof spaced apart a distance substantially equal to the thickness of the swaging disk;
   and means connected to the swaging disk for forcing the rotary swaging disk into the heated malleable portion of the pipe section, whereby the periphery of the swaging disk progressively constricts the heated malleable portion of the pipe section and severs the same to form two closed end pipes;
   said swaging disk adapted to impart a flat surface to the closed ends of said pipes.

2. A machine for forming two closed end pipes by progressively constricting and severing a heated malleable portion of the pipe section comprising;
   a single rotatable swaging disk;
   power means connected to the disk for rotating the same;
   a pair of rotatable regulating rollers for cradling a pipe section having a heated, malleable portion; said regulating rollers each being provided with a surface which supports the pipe section at the heated malleable portion thereof;
   power means connected to said regulating rollers for imparting rotary motion thereto;
   a shiftable pressure roller mounted in a position to engage the pipe section which is cradled between the regulating rollers; said pressure roller being provided with two sections axially aligned, with the adjacent inner ends thereof spaced apart a distance substantially equal to the thickness of the swaging disk;
   means for forcing the shiftable pressure roller into engagement with the pipe section which is cradled between said regulating rollers;
   and means for forcing the swaging disk into engagment with the heated malleable portion of the pipe section, whereby the periphery of the swaging disk progressively constricts the heated malleable portion of the pipe section and severs the same to form two closed end pipes;
   said swaging disk adapted to impart a flat surface to the closed ends of said pipes.

3. A machine for forming two closed end pipes by progressively constricting and severing a heated malleable midportion of a pipe section comprising;
   a single rotatable swaging disk;
   power means connected to the disk for rotating the same;
   a pair of rotatable regulating rollers mounted in spaced parallel relationship and adapted to cradle a pipe section therebetween having a heated, malleable midportion; said regulating rollers each being provided with a surface which supports the pipe section at the heated malleable portion thereof;
   means connected to said rollers for imparting rotary motion thereto in the same direction, thereby adapting the rollers to rotate a pipe section;
   a pressure roller mounted for shifting motion adjacent said regulating rollers; said pressure roller being provided with two sections axially aligned, with the adjacent inner ends thereof spaced apart a distance substantially equal to the thickness of the swaging disk;

a first power means connected to the pressure roller for forcing the pressure roller into engagement with the pipe section which is cradled between said regulating rollers;

and a second power means connected to said swaging disk for forcing the swaging disk into tracking engagement with the heated malleable mid-portion of the pipe section and for shifting the swaging disk through the pipe section to and beyond the central axis thereof, whereby the periphery of the swaging disk progressively constricts the heated malleable mid-portion of the pipe section and severs the same to form two closed end pipes.

4. A machine for forming two closed end pipes by progressively constricting and severing a heated malleable mid-portion of a pipe section comprising;

a single rotatable swaging disk;

power means connected to the disk for rotating the same;

a pair of rotatable regulating rollers mounted in spaced parallel relationship and adapted to cradle a pipe section having a heated, malleable mid-portion; said regulating rollers each being provided with a surface which supports the pipe section at the heated malleable portion thereof;

means connected to said rollers for imparting rotary motion thereto in the same direction;

a pair of spaced stops mounted in positions to engage the opposite ends of the pipe section which is cradled between the regulating rollers;

a pressure roller mounted for shifting motion adjacent said regulating rollers and adapted to engage the pipe section which is cradled between the regulating rollers; said pressure roller being provided with two sections axially aligned, with the adjacent inner ends thereof spaced apart a distance substantially equal to the thickness of the swaging disk;

power means connected to the pressure roller adapted to force the pressure roller into engagement with the pipe section which is cradled between said regulating rollers;

and means connected to said swaging disk for forcing the swaging disk into tracking engagement with the heated malleable mid-portion of the pipe section and for shifting the swaging disk through the pipe section to and beyond the central axis thereof, whereby the periphery of the swaging disk progressively constricts the heated malleable mid-portion of the pipe section and severs the same to form two closed end pipes;

said stops confining the pipe section axially during said swaging action, thereby adapting said malleable mid-portion of the pipe section to be crowded outwardly to form the said closed ends.

5. A machine for forming two closed end pipes by progressively constricting and severing a heated malleable mid-portion of a pipe section comprising;

a support table;

a single rotatable swaging disk mounted for shifting motion above said table;

a first power means connected to said disk for rotating the same;

the said disk having a substantial thickness delineated by parallel sides, the periphery of said disk being in the form of a leading edge having a thickness substantially less than the total thickness of said disk;

said leading edge being delineated by a pair of diverging surfaces extending from the leading edge outwardly to the opposite sides of the disk;

a pair of regulating rollers mounted for rotation above said table;

said rollers being spaced in parallel relationship and adapted to cradle therebetween a pipe section having a heated, malleable mid-portion, said regulating rollers each being provided with a surface which supports the pipe section at the heated malleable portion thereof;

a second power means connected to said regulating rollers and for rotating said regulating rollers in the same direction, thereby to impart rotary motion to the pipe section cradled between said rollers;

a rotatable pressure roller mounted above said regulating rollers and adapted to be shifted relative to the regulating rollers, thereby to engage a pipe section which is cradled between the regulating rollers; said pressure roller being provided with two sections axially aligned, with the adjacent inner ends thereof spaced apart a distance substantially equal to the thickness of the swaging disk;

means connected to said swaging disk for shifting said disk toward the pipe section which is confined in rotation between the regulating rollers and pressure roller;

said leading edge and the diverging surfaces of the disk being adapted to track upon and progressively constrict the heated malleable mid-portion of the pipe wall during the shifting motion of the swaging disk and finally to sever the constricted wall to form two lengths of pipe with the heated mid-portion of the pipe wall swaged to form respective closures on the adjacent ends of said lengths of pipe.

6. A machine for forming two closed end pipes by progressively constricting and severing a heated malleable mid-portion of a pipe section comprising;

a support table;

a single rotatable swaging disk mounted for shifting motion in a vertical plane above said table;

a first power means connected to said disk for rotating the same;

a pair of regulating rollers mounted for rotation above said table;

said rollers being spaced in parallel relationship and adapted to cradle therebetween a pipe section having a heated malleable mid-portion; said regulating rollers each being provided with a surface which supports the pipe section at the heated malleable portion thereof;

a second power means connected to said regulating rollers and for rotating said regulating rollers in the same direction, thereby to impart rotary motion to the pipe section which is cradled between said rollers;

a pressure roller mounted above said regulating rollers and adapted to be shifted in a vertical plane relative to the regulating rollers, thereby to engage a pipe section which is cradled between the regulating rollers;

said pressure roller comprising two sections axially aligned, with the adjacent inner ends thereof spaced apart from one another a distance substantially equal to the thickness of the swaging disk, thereby providing clearance adapting said swaging disk to shift downwardly between said sections of the pressure roller during motion of said swaging disk in a vertical plane;

means connected to said swaging disk for forcing said disk toward the pipe section which is confined in rotation between the regulating rollers and pressure roller sections;

said swaging disk adapted to track upon and progressively constrict the heated malleable mid-portion of the pipe wall during the shifting motion of the swaging disk and finally to sever the constricted wall to form two lengths of pipe with the heated mid-portion of the pipe wall swaged to form respective closures on the adjacent ends of said lengths of pipe.

7. A machine for forming two closed end pipes by progressively constricting and severing a heated malleable mid-portion of a pipe section comprising;

a support table;

a single rotatable swaging disk mounted for shifting motion in a vertical plane above said table;

a first power means connected to said disk for rotating the same;

the said disk having a substantial thickness delineated by parallel sides, the periphery of said disk being in the form of a leading edge having a thickness substantially less than the total thickness of said disk;

said leading edge being delineated by a pair of diverging surfaces extending from the leading edge outwardly to the opposite sides of the disk;

a pair of regulating rollers mounted for rotation above said table;

said rollers being spaced in parallel relationship and adapted to cradle therebetween a pipe section having a heated, malleable mid-portion; said regulating rollers each being provided with a surface which supports the pipe section at the heated malleable portion thereof;

a second power motor connected to said regulating rollers for rotating said regulating rollers in the same direction, thereby to impart rotary motion to the pipe section cradled between said rollers;

a rotatable pressure roller mounted above said regulating rollers and adapted to be shifted in a vertical plane relative to the regulating rollers, thereby to engage a pipe section which is cradled between the regulating rollers;

said pressure roller comprising two sections axially aligned, with the adjacent inner ends thereof spaced apart from one another a distance substantially equal to the thickness of the swaging disk, thereby providing clearance adapting said swaging disk to shift downwardly between said sections of the pressure roller during motion of said swaging disk in a vertical plane;

power means connected to said pressure roller for shifting said roller sections downwardly into pressure engagement with the pipe section which is cradled between said regulating rollers;

means connected to said swaging disk for forcing said disk toward the pipe section which is confined in rotation between the regulating rollers and pressure roller sections;

said leading edge and the diverging surfaces of the swaging disk being adapted to track upon and progressively constrict the heated malleable mid-portion of the pipe wall during the shifting motion of the swaging disk and finally to sever the constricted wall to form two lengths of pipe with the heated mid-portion of the pipe wall swaged to form respective closures on the adjacent ends of said lengths of pipe.

8. A machine for forming two closed end pipes by progressively constricting and severing the heated malleable mid-portion of a pipe section comprising;

a support table;

a carriage pivotally connected to said table for swinging motion;

a single rotatable swaging disk mounted for rotation on one end portion of said carriage;

a power motor mounted upon an opposite end portion of said carriage and in driving connection with the swaging disk, thereby to impart rotary motion to the swaging disk;

a pair of regulating rollers mounted in parallel relationship relative to said table;

a power motor connected to said regulating rollers adapted to rotate said regulating rollers in the same direction;

said regulating rollers adapted to cradle a pipe section therebetween having a heated, malleable mid-portion and to impart rotary motion to said pipe section; said regulating rollers each being provided with a surface which supports the pipe section at the heated malleable portion thereof;

a hold-down frame pivotally connected to said table for swinging motion relative to the regulating rollers;

a pressure roller rotatably mounted within said hold-down frame; said pressure roller being provided with two sections axially aligned, with the adjacent inner ends thereof spaced apart a distance substantially equal to the thickness of the swaging disk;

said hold-down frame adapted to swing said pressure roller in an arc and into pressure engagement with the pipe section which is cradled between said regulating rollers, whereby said regulating rollers and pressure roller impart rotary motion to the pipe section;

and means for pivoting said carriage and swaging disk through an arc and into tracking engagement with the pipe section which is confined in rotation between the regulating rollers and pressure roller;

the swaging disk adapted to progressively constrict the heated, malleable mid-portion of the pipe section towards the central axis thereof and to sever the constricted portion to form two lengths of pipe with the heated mid-portion of the pipe wall swaged to form respective end closures on the adjacent ends of the said lengths of pipe.

9. A machine for forming two closed end pipes by progressively constricting and severing the heated malleable portion of a pipe section comprising;

a support table;

a carriage pivotally connected to said table for swinging motion;

a single rotatable swaging disk mounted for rotation on one end portion of said carriage;

a power motor mounted upon an opposite end portion of said carriage and in driving connection with the swaging disk, thereby to impart rotary motion to the swaging disk;

a pair of regulating rollers mounted in parallel relationship relative to said table;

a power motor connected to said regulating rollers for rotating said regulating rollers in the same direction;

said regulating rollers adapted to cradle a pipe section therebetween having a heated, malleable mid-portion and to impart rotary motion to said pipe section; said regulating rollers each being provided with a surface which supports the pipe section at the heated malleable portion thereof;

a hold-down frame pivotally connected to said table for swinging motion relative to the regulating rollers;

a pressure roller rotatably mounted within said hold-down frame; said pressure roller being provided with two sections axially aligned, with the adjacent inner ends thereof spaced apart a distance substantially equal to the thickness of the swaging disk;

said hold-down frame adapted to swing said pressure roller in an arc and into pressure engagement with the pipe section which is cradled between said regulating rollers, whereby said regulating rollers and pressure roller impart rotary motion to the pipe section;

a first power means connected to said hold-down frame for swinging said frame and pressure roller through an arc into pressure engagement with the pipe section;

and a second power means connected to said carriage for swinging said carriage and swaging disk through an arc and into tracking engagement with the pipe section which is confined in rotation between the regulating rollers and pressure roller;

the swaging disk thereby adapted to progressively constrict the heated, malleable mid-portion of the pipe section towards the central axis thereof and to sever the constricted portion to form two lengths of pipe with the heated mid-portion of the pipe wall swaged to form respective end closures on the adjacent ends of the said lengths of pipe during the swinging motion thereof through said arc.

10. A machine for forming two closed end pipes by progressively constricting and severing a heated malleable mid-portion of a pipe section comprising;

a support table;

a single rotatable swaging disk mounted for shifting motion above said table in a vertical plane;

a first power means connected to said swaging disk for rotating the same;

a pair of regulating rollers mounted for rotation above said table;

said rollers being spaced in parallel relationship and adapted to cradle therebetween a pipe section having a heated, malleable mid-portion; said regulating rollers each being provided with a surface which supports the pipe section at the heated malleable portion thereof;

a second power means connected to said regulating rollers for rotating said regulating rollers in the same direction, thereby to impart rotary motion to the pipe section cradled between said rollers;

a pressure roller mounted above said regulating rollers and adapted to be shifted in a vertical plane relative to the regulating rollers, thereby to engage a pipe section which is cradled between the regulating rollers;

said pressure roller comprising two sections axially aligned, with the adjacent inner ends thereof spaced apart from one another a distance substantially equal to the thickness of the swaging disk, thereby providing clearance adapting said swaging disk to shift downwardly between said sections of the pressure roller during motion of said swaging disk in a vertical plane;

means connected to said swaging disk for shifting said disk toward the pipe section which is confined in rotation between the regulating rollers and pressure roller sections;

said swaging disk adapted to track upon and progressively constrict the heated malleable mid-portion of the pipe wall during the shifting motion of the swaging disk and finally to sever the constricted wall to form two lengths of pipe, with the heated mid-portion of the pipe wall swaged to form respective closures on the adjacent ends of said lengths of pipe;

the adjacent inner ends of the pressure roller sections being disposed in proximity to the opposite sides of the swaging disk and adapted to track against the heated malleable mid-portion of the pipe section, said pressure roller sections and regulating rollers thereby maintaining the true diameter of the pipe during formation of said end closures.

11. A machine for forming two closed end pipes by progressively constricting and severing a heated malleable mid-portion of a pipe section comprising;

a support table;

a single rotatable swaging disk mounted for shifting motion above said table in a vertical plane;

a first power means connected to said swaging disk for rotating the same;

a pair of regulating rollers mounted for rotation above said table;

said rollers being spaced in parallel relationship and adapted to cradle therebetween a pipe section having a heated, malleable mid-portion; said regulating rollers each being provided with a surface which supports the pipe section at the heated malleable portion thereof;

a second power means connected to said regulating rollers and for rotating said regulating rollers in the same direction, thereby to impart rotary motion to the pipe section cradled between said rollers;

a pressure roller mounted above said regulating rollers and being shiftable in a vertical plane relative to the regulating rollers, thereby to engage a pipe section which is cradled between the regulating rollers;

said pressure roller comprising two sections axially aligned, with the adjacent inner ends thereof spaced apart from one another a distance substantially equal to the thickness of the swaging disk, thereby providing clearance adapting said swaging disk to shift downwardly between said sections of the pressure roller during motion of said swaging disk in a vertical plane;

means connected to said swaging disk adapted to shift said disk toward the pipe section which is confined in rotation between the regulating rollers and pressure roller sections;

said swaging disk adapted to track upon and progressively constrict the heated malleable mid-portion of the pipe wall during the shifting motion of the swaging disk and finally to sever the constricted wall to form two lengths of pipe with the heated mid-portion of the pipe wall swaged to form respective closures on the adjacent ends of said lengths of pipe;

said regulating rollers and pressure roller sections adapted to impart rotary motion to the pipe section from opposite ends without imparting twisting forces to the pipe section;

said first power means imparting a peripheral speed to the swaging disk which is substantially equal to the surface speed imparted to said rotating pipe section by the second power means of the regulating rollers.

References Cited by the Examiner

UNITED STATES PATENTS

| | | | |
|---|---|---|---|
| 2,709,381 | 5/1955 | Enghauser | 228—2 |
| 2,754,705 | 7/1956 | Enghauser | 228—2 |

JOHN F. CAMPBELL, *Primary Examiner.*

M. L. FAINGUS, *Assistant Examiner.*